US010892984B1

(12) United States Patent
Statton et al.

(10) Patent No.: US 10,892,984 B1
(45) Date of Patent: Jan. 12, 2021

(54) FRAMEWORK FOR ROUTING MEDIA STREAMS IN A PROVIDER NETWORK

(71) Applicant: Amazon Technologies, Inc., Seattle, WA (US)

(72) Inventors: Evan Statton, Denver, CO (US); Michael Coleman, Portland, OR (US); Alan Judge, Dublin (IE); Richard H. Galliher, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/454,924

(22) Filed: Jun. 27, 2019

(51) Int. Cl.
*H04L 12/703* (2013.01)
*H04L 12/24* (2006.01)
*H04L 29/06* (2006.01)

(52) U.S. Cl.
CPC .......... *H04L 45/28* (2013.01); *H04L 41/0668* (2013.01); *H04L 41/08* (2013.01); *H04L 65/60* (2013.01)

(58) Field of Classification Search
None
See application file for complete search history.

(56) References Cited

U.S. PATENT DOCUMENTS

| | | | |
|---|---|---|---|
| 2013/0083693 A1* | 4/2013 | Himura | H04L 12/4641 370/254 |
| 2017/0063731 A1* | 3/2017 | Muller | H04L 43/10 |
| 2018/0041425 A1* | 2/2018 | Zhang | H04W 76/11 |
| 2019/0190823 A1* | 6/2019 | Means | H04L 45/586 |
| 2020/0099585 A1* | 3/2020 | Chen | H04L 45/64 |

* cited by examiner

*Primary Examiner* — Brian S Roberts
(74) *Attorney, Agent, or Firm* — Nicholson De Vos Webster & Elliott, LLP

(57) ABSTRACT

Techniques for routing media streams in a provider network are described. A media routing service is disclosed that comprises one or more virtual media routers for routing media streams from one or more media sources to one or more downstream devices coupled to the provider network. The media routing service provides external entities (e.g., users) of the provider network with the ability to request for a virtual media router for routing media content and determines the appropriate set of computing resources necessary to provision and launch the virtual media router in the provider network. In certain embodiments, the media routing service processes routing commands generated by a client, generates routing information comprising source to destination mappings based on the routing commands, and securely distributes media content to identified downstream devices based on the routing information.

20 Claims, 9 Drawing Sheets

FRAMEWORK FOR ROUTING MEDIA STREAMS IN A PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

The number of devices (e.g., downstream devices) coupled to service provider networks (also referred to herein as just "provider networks") is increasing rapidly. As the number of media streams streamed to these devices increase, the complexity of routing these streams from and to these devices also increases.

BRIEF DESCRIPTION OF DRAWINGS

Various embodiments in accordance with the present disclosure will be described with reference to the drawings, in which.

DETAILED DESCRIPTION

Figure 1:
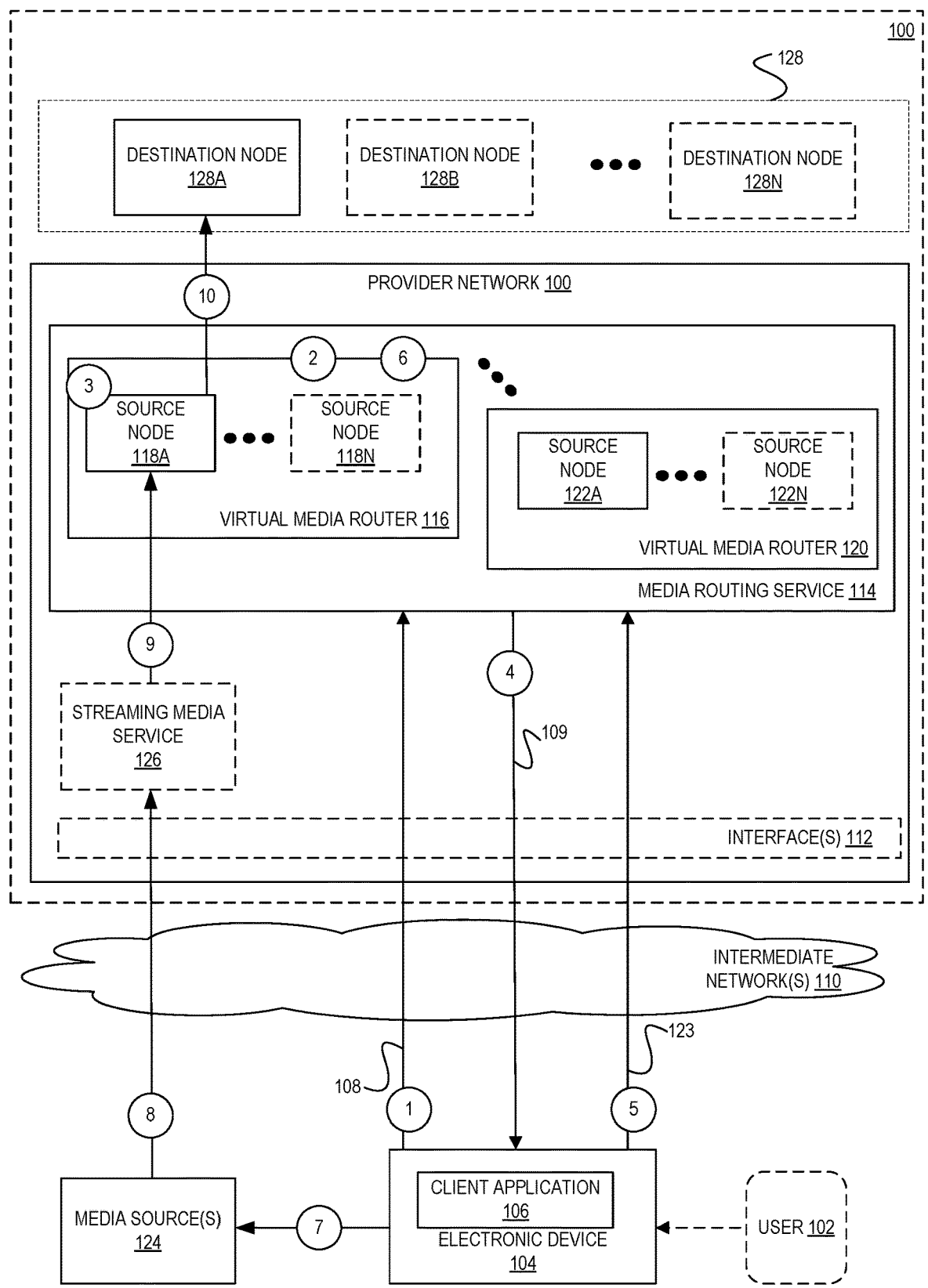
FIG. 1 is a diagram illustrating a framework for routing media streams in a provider network, according to some embodiments.

The present disclosure relates to methods, apparatus, systems, and non-transitory computer-readable storage media for routing media streams in a provider network. According to some embodiments, a media routing service is disclosed that provides a framework for routing media streams in a provider network. In certain embodiments, the media routing service comprises one or more virtual media routers that are capable of routing media streams from one or more media sources to one or more downstream devices coupled to the provider network. In certain embodiments, the media routing service provides external entities (e.g., users) of the provider network with the ability to request for a virtual media router for routing media content from one or more media sources to one or more downstream devices. The media routing service determines the appropriate set of computing resources necessary to provision and launch the virtual media router in the provider network. In certain embodiments, the media routing service processes routing commands generated by a client (for example, from router panels), generates routing information comprising source to destination mappings based on the routing commands, and securely distributes media content to identified downstream devices based on the routing information.

A router generally refers to a device that receives a media source at an input port and routes the media source to an output port at which the data stream is available to one or more downstream devices. For instance, a router may be utilized in a communication network (e.g., a provider network) to route a selected media source to one or more downstream devices coupled to the provider network. Traditionally, routers have been implemented as core switches in a remote production control site. For example, an operator located at the remote production control site may manually operate a router to control the transmission of media content streamed from one or more media sources to one or more downstream devices. However, as the number of media streams streamed to these downstream devices have increased, the complexity of routing the streams to and from these devices has also increased.

The size (i.e., the number of input and output ports) of a router can be potentially increased to handle high volumes of traffic in a communication network. However, the complexity of creating efficient routing within the router and between the downstream devices also increases non-linearly when the size of a router increases. A large sized router may be useful, for instance, when the communication network generally experiences a uniformly high traffic workload. However, communication networks (e.g., provider networks) often experience variable traffic workloads at different time periods in a year. For instance, a communication network may experience unpredictable and/or low traffic volumes during certain time periods but receive unusually high volumes of traffic at other time periods, for instance, during the occurrence of a cyclic event, such as a local sports event. Operating large sized routers in situations when the communication network experiences low traffic volumes leads to resource inefficiency and higher router maintenance costs for users (operators) at remote production control sites.

Embodiments of the disclosed media routing service address these and other issues by providing a framework for routing media streams using one or more virtual media routers in a provider network. The media routing service can automatically provision one or more virtual media routers in the provider network in response to requests received from external entities (e.g., users) of the provider network, in response to varying workloads experienced by the provider network or based on the characteristics of media streams streamed to the provider network. The media routing service can dynamically scale up the number of virtual media routers when the provider network experiences high volumes of traffic and use fewer virtual media routers when the traffic volume is low.

In certain embodiments, the media routing service can distribute the routing of media streams across multiple source nodes within the provider network. As described herein, a "source node" may represent a virtual or a physical computing instance that is launched by a virtual media router in the media routing service for routing media steams from one or more media sources to one or more downstream devices coupled to the provider network. In certain embodiments, the virtual media router may implement various Application Programming Interfaces (APIs) that permit external entities to interact with the virtual media router, e.g., to configure various tasks performed by the virtual media router. These tasks may include, for instance, accepting and processing requests for creating source nodes, provisioning computing resources for source nodes, transmitting routing information to source nodes, determining source to destination mappings for source nodes, tracking routes of media streams originating from a media source to a particular source node and destined to one or more destination nodes, and the like.

FIG. 1 is a diagram illustrating a framework for routing media streams in a provider network, according to some embodiments. In certain embodiments, a media routing service 114 is disclosed that provides a framework for routing media streams in the provider network. The media routing service 114 may include various components, modules, or functionalities such as one or more virtual media routers 116, 120. The virtual media routers 116, 120 may be implemented in hardware, software or a combination of both and collectively used by the media routing service 114 to perform the routing of media streams to various destinations within and outside the provider network.

The provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 110 (e.g., the internet) via one or more interface(s) 110, such as through use of application programming interface (API) calls, via a console implemented as a website or application, etc. The interface(s) 111 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In accordance with certain embodiments, a media routing service 114 routes media streams from one or more media source(s) 124 to one or more destination nodes 128A-128N. The media source(s) 120 may represent, for instance, television studios, content providers, broadcasters (with multiple 24×7 live TV channels), and the like and may be implemented within the provider network or outside the provider network. The destination nodes 128A-128N may represent video processing systems provided by the provider network, a content distribution network (CDN) that is downstream to the destination nodes, a playback device or website where users view content, monitors, projectors, televisions, and the like. In certain embodiments, the destination nodes 128A-128N may represent one or more downstream devices that may be associated with and/or operated by one or more end-users of the media routing service 114. In certain embodiments, an "end-user" may represent a customer (e.g., an individual entity or group entity) of the media routing service 114. For example, the end-user may be associated with the media routing service 114 and may have an account that has privileges to access media content provided by the media routing service 114. The access may be fee-based or may instead be free to the user (potentially with advertisements in the streaming media). However, some media may also be streamable to end-users without accounts or other arrangements, e.g., on websites that provide the streaming media. In FIG. 1, the destination nodes 128A-128N are shown as part of the provider network, though in other embodiments, the destination nodes 128A-128N may be implemented outside of the provider network, such as within a private or "on premise" network environment of an organization. In certain embodiments, the destination nodes may represent computing nodes (e.g., virtualized computing resource instances mapped to destination public IP addresses) within the provider network or outside the provider network.

In certain embodiments, the media routing service 114 may comprise one or more virtual media routers (e.g., 116 or 120) that are responsible for routing media streams from media source(s) 124 to destination nodes 128A-128N. In some embodiments, a virtual media router (e.g., 116 or 120) may be implemented using one or more source nodes (118A-118N) or (122A-122N) respectively. As noted above, a "source node" may represent a virtual or a physical computing instance launched by a virtual media router for routing media steams from the media source(s) 124 to the destination node(s) 128A-128N. In certain embodiments, the source nodes of a virtual media router (e.g., 116 or 120) may use unicast transmission techniques (rather than multicast transmission techniques) to send the elements (i.e., packets or other units of data) of a media stream to one or more recipients (e.g., destination nodes) on an individual basis. To perform replication of the media stream to multiple recipients, the source node may generate one or more packets or other units of data that include the element(s) of the media stream (potentially after being processed or transformed by the source node) in a form that is transmissible to the recipients. The source node may individually address the packet(s) to each of the recipients, e.g., such that each element of the media stream is not sent once to a group address but sent separately and in parallel to individual addresses of the recipients.

In certain embodiments, the media routing service 114 may perform a variety of tasks such as accepting and processing requests for creating source nodes from users, accepting routing commands, determining source to destination mappings for a source node based on the routing commands, tracking routes of media streams originating from a media source to a source node and destined to one or more destination nodes, and provisioning computing resources for source nodes. Additional details of the operations performed by the media routing service is discussed below.

According to some embodiments, in FIG. 1, at (1), a user 102 of the provider network 100 may submit a request 108 to the media routing service 114 to create a source node (e.g., 118A) in a virtual media router (e.g., 116). In certain embodiments, the operations performed at (1) may include submitting, by the user, a request to create a virtual media router (e.g., 116) in the media routing service 114 prior to creating a source node. For example, the user 102 may be an operator located at a remote production control site who controls the transmission of media content streamed from media source(s) 124 to the media routing service 114. In certain examples, the request to create a source node may be submitted by the user 102 via a client application 106 of an electronic device 104. For example, the user 102 may utilize a web-based console, command-line interface (CLI), or any other available interface in the client application 106 to generate the request. Examples of electronic devices may include personal computers (PCs), cell phones, handheld messaging devices, laptop computers, set-top boxes, personal data assistants, electronic book readers, wearable electronic devices (e.g., glasses, wristbands, monitors), and the like.

In certain embodiments, the request 108 may specify one or more source node parameters associated with the creation of a source node. The source node parameters may specify, for instance, an identifier of a particular media stream originating from the media source(s) 124, an endpoint (e.g., a unique identifier such as an IP address) of the virtual media router (e.g., 116) to send the request to, and other characteristics associated with the media stream. For example, if the media stream represents a live video stream, an identifier of the media stream may indicate a particular channel of the media stream. As another example, if the media stream represents prerecorded media content, the identifier may indicate a particular media asset from a library of media. The characteristics associated with the media stream may include, for instance, the size, type (audio/video), resolution, bit rate, audio/video quality and other parameters of the media stream. In certain embodiments, the request may specify other information associated with the media stream such as whether replication of the media stream is required, the number of recipients (e.g., destination nodes) that the media stream has to be replicated and transmitted to, and so on.

In one example, the request 108 may be modeled as an Application Programming Interface (API) request and included in a HTTP request message to the virtual video router 116. The API request may include header information specifying, for example, the identifier of a particular media stream, the endpoint of the virtual media router to which the request is being sent, and other characteristics associated with the media stream (as noted above). In some examples, the source node creation API request may also include parameters such as user authorization details, a time and date at which the request was generated, and the like.

In certain embodiments, at (2), the request 108 may be received by the virtual media router 116 via any suitable interface(s) 112 in the provider network. In certain examples, a virtual video router controller (shown in FIG. 2) in the virtual media router 116 may accept and process the request 108 from the client application. In certain embodiments, the virtual video router controller may process the request by determining the appropriate set of computing resources necessary to provision and launch the particular source node in the virtual media router. Additional details of the operations performed by the virtual media router to provision and launch a source node are discussed in relation to FIG. 2.

At (3), the virtual media router 116 launches a source node (e.g., 118A) and associates a name and identifier (e.g., IP address) with the source node, and in some embodiments, at (4), transmits a response 109 to the client application 106 that includes the source node identifier along with other information (e.g., source node name) associated with the source node. The response may comprise a HTTP message comprising a payload with the name of the source node and the source node identifier (e.g., IP address). In certain embodiments, the source node identifier may be displayed to the user via an interface in the client application 106.

In certain embodiments, at (5), the user 102 may submit one or more routing commands 123 to the virtual media router 116. In certain examples, the routing commands may include an identifier of a particular media stream to be routed from a particular source node to one or more destination nodes, a source node identifier (e.g., IP address) associated with the source node, and one or more identifiers (e.g., IP addresses) of the destination nodes. In certain examples, the user 102 may utilize a web-based GUI, CLI, or any other type of interface in the client application 106 to submit the routing commands. The user 102 may utilize the same set of graphical user interfaces (GUIs) or sequence of CLI prompts as that used to create the source node described above or a different set of interfaces in the client application 106 to submit the routing commands In some examples, the routing commands can be transmitted to the virtual media router 116 as a routing command API request. The routing command API request may include an identifier (i.e., IP address) of the source node, a media stream identifier of the media stream to be streamed to the source node, and one or more destination node identifiers associated with one or more destination nodes where the stream will be transmitted. In some embodiments, routing command API request may include additional parameters indicating, for example, a user account associated with the request, authorization parameters, date and time information, and so forth.

At (6), the routing commands 123 are received by the virtual media router 116, which, in turn, uses the routing commands to populate and/or update its routing table. In certain embodiments, the routing table in a virtual media router 116 may store routing information associated with the source nodes implemented by the virtual media router. The routing information may include, for instance, source node identifiers associated with each source node, identifiers of media streams to be routed from each source node to one or more destination nodes, destination node identifiers associated with the destination nodes and the distance to each destination node. Additional details of the implementation of a routing table by the virtual media router is discussed in relation to FIG. 2.

Upon creation of a source node and the populating and/or updating of routing information in a routing table associated with the virtual media router 116 as discussed above, in certain embodiments, at (7), the user 102 may transmit, via the client application 106, a message to the media source(s) 124 to begin transmission of a particular media stream to the source node. The message may include, for instance, the identifier of the media stream and the identifier of the source node (e.g., IP address of the source node) in the virtual media router that the media stream should be directed to (i.e., routed to) in the provider network.

At (8), the media source(s) 124 may transmit the media stream to the source node. In certain embodiments, the media stream may be transmitted via a streaming media service 126 in the provider network that is capable of ingesting the media stream from the media source(s) 124 and transmitting the media stream to the identified source node in the virtual media router. The streaming media service 126 may be configured to acquire signals representing the media stream from the media source(s) 124 over multiple channels (e.g., satellite, terrestrial, and so on). The signal may be acquired using any of several suitable transport mechanisms, including a camera feed, a microphone feed, an internet protocol (IP) connection, an asynchronous serial interface (ASI) connection, and so on.

At (9), the streaming media service 126 may transmit signals representing the media stream to the identified source node in the virtual media router. In certain embodiments, the streaming media service 126 may transform the media stream into a particular video or audio format before transmitting the media stream to the source node. For example, the streaming media service 126 may transform the media stream by dividing the media stream into segments or chunks of a fixed or variable size (e.g., 10 seconds in length) for delivery to the source node. In certain embodiments, the streaming media service 126 may perform encoding tasks (e.g., compression, segmentation, and so on) on the media stream before passing the encoded stream to the virtual video router.

At (10), the source node may receive the media stream and securely distribute the media stream to the identified destination nodes based on the routing information stored in the routing table. The operations performed by a source node to distribute a media stream to multiple identified destinations inside or outside the provider network based on routing information is discussed in detail in FIG. 2. It is to be understood that the media routing service 114 shown in FIG. 1 is only one representation of media routing service 114 used to implement some embodiments, and various alternate formulations with more or fewer virtual media routers 116, 120 could alternatively be used and implemented by one of ordinary skill in the art in possession of this disclosure to implement the various embodiments described herein.

Figure 2:
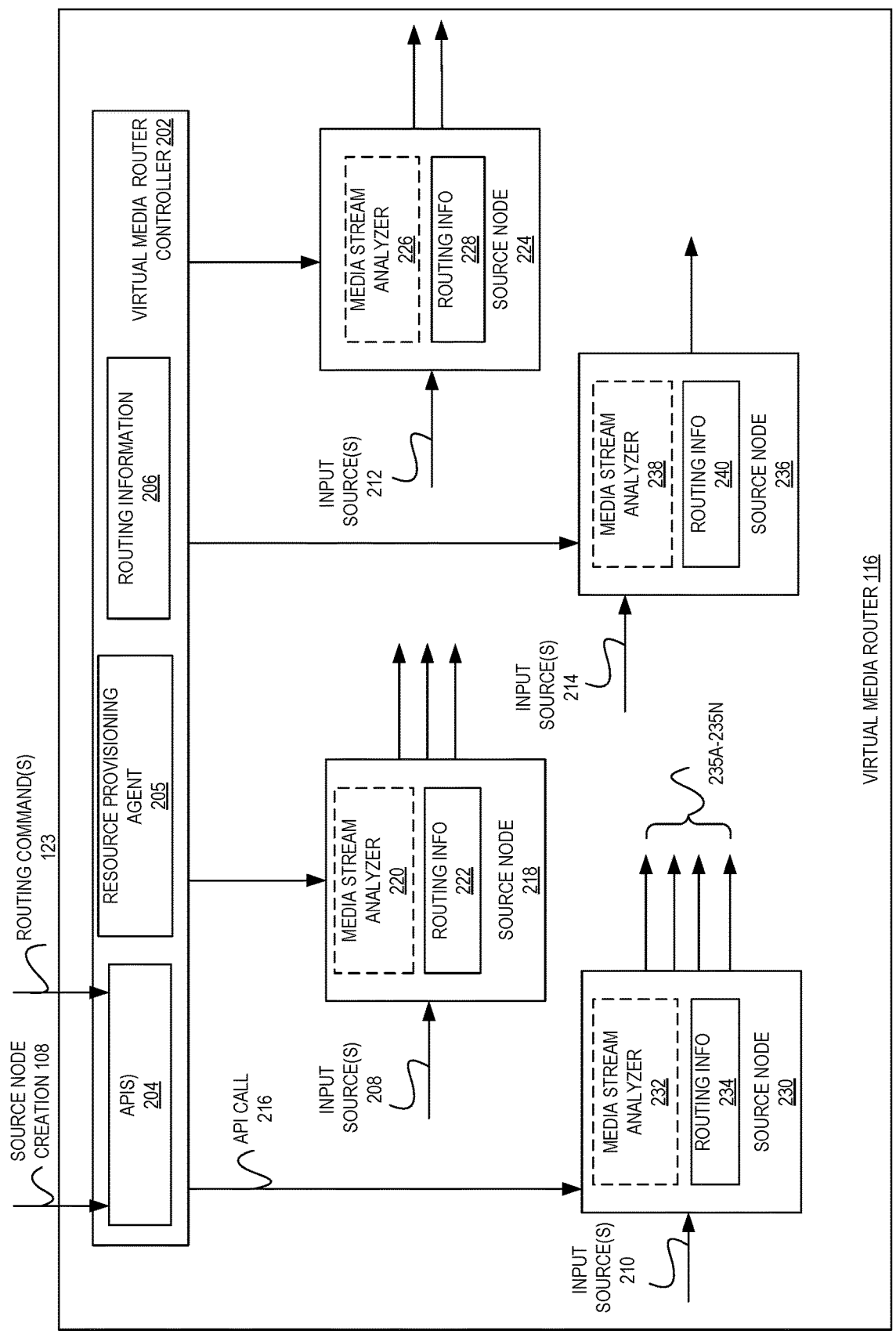
FIG. 2 is an illustration of a virtual media router implemented by a media routing service of the provider network according to some embodiments.

FIG. 2 is an illustration of a virtual media router implemented by a media routing service of the provider network according to some embodiments. As illustrated, in certain embodiments, a virtual media router 116 may be implemented using one or more source nodes 218, 224, 230, and 236 and a virtual media router controller 202. The virtual media router controller 202 may perform a variety of tasks and/or operations such as accepting and processing requests (e.g., source node creation requests 108, routing commands 123, and the like) from users, determining source to destination mappings for source nodes based on the routing commands, tracking routes of media streams originating from media sources to various source nodes destined to one or more destination nodes, provisioning computing resources for source nodes, authorization and access control, API management, and the like.

In certain embodiments, the virtual media router controller 202 may implement various APIs 204 that permit external entities (e.g., a user 102) to interact with the virtual media router, e.g., to configure various tasks performed by the virtual media router. For example, the APIs 204 may be available to a user (e.g., 102) via a client application (e.g., 106) on the user's device 104. In certain examples, as discussed in relation to FIG. 1, the APIs may include a source node creation request API for creating a source node in the virtual media router 116, a routing command request API for transmitting routing commands to the virtual video router controller 202, and so on.

In certain embodiments, the virtual media router controller 202 may include a resource provisioning agent 205 for processing requests from users. For instance, the resource provisioning agent 205 may process requests for source node creation 108. In certain embodiments, when the virtual media router controller 202 receives a source node creation request 108 from a user, the resource provisioning agent 205 processes the request to determine the appropriate set of computing resources necessary to provision and launch the source node. For instance, the processing (for e.g., by the processor 205) may involve determining whether the required resources are available to create the source node and whether they are in accordance with the allocation policies of the provider network. In certain embodiments, the resource provisioning agent 205 may transmit a message (e.g., via an API call) to a virtualization service (not shown in FIG. 2) in the provider network to request allocation of one or more computing resources to launch (i.e., "spin up")

a source node. For instance, the message may specify a particular configuration of computing resources (e.g., CPU, memory, and possibly other hardware resources) to be allocated to launch the source node. The virtualization service may provision the source node by selecting the appropriate type of resources from a resource pool and make it available to the virtual media router controller 202. In some examples, the processing by the resource provisioning agent 205 may involve launching multiple instances of the source node or launching a new instance of the source node. For example, the resource provisioning agent may launch multiple instances of a source node based on determining (for example, based on the source node creation request 108) that replication of the media stream to a certain number of recipients (destination nodes) is required.

In certain embodiments, the resource provisioning agent 205 may include capabilities to pre-allocate and manage a reserve capacity or pool of source nodes. For instance, an operator of the virtual media controller may utilize one or more APIs 204 to create or configure a virtual media router 116 to maintain some number of source nodes in a reserve capacity pool. Thus, in some embodiments, upon receipt of a source node creation request 108 from the user, the virtual media router controller 202 may be able to near-instantaneously utilize a source node from the reserve capacity pool to service the request, e.g., instead of needing to (slowly) create and configure an entirely new source node at that time.

In certain embodiments, the resource provisioning agent 205 may include capabilities to dynamically increase or decrease the capability of a source node by automatically scaling the source node to be able to transmit a media stream to different numbers of destinations. For instance, a user (as part of routing commands 123) may specify that a source node be able to handle transmission of a media stream to a certain number (e.g., 30) of destinations while the actual capability of the source node may be to handle traffic to a smaller number (e.g., 10) of destinations. In this case, the resource provisioning agent 205 may scale the source node by launching multiple (or additional) virtual source node instances collectively acting as a single source node capable of handling the transmission of the media stream to the specified number of destinations. In certain embodiments, the resource provisioning agent 205 may include capabilities to dynamically increase or decrease the capacity of a source node by using a source node with a larger capacity or a source node with a smaller capacity depending on the requirement of the source node to handle the transmission of the media stream to a certain number of destination nodes.

In certain embodiments, a computing node (e.g., a virtualized computing resource instance) in the provider network (or potentially outside of the provider network) can register itself as a source node with a particular virtual media router (e.g., 116) in the provider network. For instance, a computing node may register its capabilities with the virtual media router and request the virtual media router to control it by transmitting a request (e.g., via an API call) to the virtual media router. A virtual media router controller (e.g., 202) in the virtual media router may receive and process the API request and register the computing node as one of its source nodes.

In certain embodiments, the virtual media router controller 202 may receive routing commands 123 from users and utilize the routing commands to populate and/or update its routing table. The routing table may store routing information 206 associated with each of the source nodes implemented by the virtual media router 116. In certain examples, the routing information may include source node identifiers associated with each source node, identifiers of media streams to be routed from each source node to one or more destination nodes, and destination node identifiers (e.g., IP addresses) of the final destinations of the media stream. In certain embodiments, the routing information may include, next hop information (i.e., an IP address) of the next source node or destination node to which the packets of the media stream should be forwarded to, and other metrics such as the distance/cost assigned to each available route so that the most cost-effective path can be chosen. In certain embodiments, when the virtual media router controller 202 receives the routing commands 123, it may send the routing information 206 stored in its routing table to each of its source nodes 218, 230, 224, and 236. In certain examples, the virtual media router controller 202 may transmit the routing information 206 via an API call 216 to the source nodes. The source nodes may receive the routing information via the API call and populate and/or update their respective routing tables with the routing information.

In certain embodiments, each source node (e.g., 218) may comprise a media stream analyzer (e.g., 220) and routing information (e.g., 222). A source node may acquire a media stream over an input source (e.g., 208) and route the media stream to the identified destination nodes based on its routing information. In certain examples, each source node may route different media streams. As noted above, in certain examples, a media source may correspond to a source (origin) of the media streams, e.g., media source(s) 124 or, in other examples, may correspond to the streaming media service 126 in the provider network that is capable of ingesting the media stream from the media source(s) 124. In some embodiments, the media stream analyzer (e.g., 220) in a source node may process and transform (or manipulate) the media stream in any of several ways (e.g., compression, encryption, encoding, decoding, changing the resolution, changing the coloring, etc.) before transmission to the identified destination nodes and for eventual distribution to viewers. The viewer may then attempt to play the media content on a viewing device. In certain embodiments, the destination nodes may also include capabilities by which they can further process and transform the media streams prior to distributing the streams to viewers or end-users.

In certain embodiments, the various source nodes 218, 230, 224, and 236 of the virtual media router 116 may be used to acquire elements of a media stream. The elements of a media stream may include packets or other units of data of the media stream that may be acquired over one or more input sources from the media source. Additionally, and/or alternatively, any of the source nodes of the virtual media router may also use redundant, parallel pathways to acquire the media stream. The signals representing a media stream may be acquired using any of several suitable transport mechanisms, including a camera feed, a microphone feed, an internet protocol (IP) connection, an asynchronous serial interface (ASI) connection, and so on.

In certain embodiments, the source node(s) may replicate the element(s) of the media stream prior to transmission to multiple recipients (e.g., one or more destination nodes 235A-235N). As noted above, to perform replication of the media stream to multiple destination nodes, the source node may generate one or more packets or other units of data that include the element(s) of the media stream (potentially after being processed or transformed by the source node) in a form that is transmissible to the recipients. The source node may individually address the packet(s) to each of the recipients, e.g., such that each element of the media stream is not sent once to a group address but sent separately and in parallel to individual addresses of the recipients. In certain embodiments, a destination node (e.g., 235A) may itself act as a downstream source node used to route elements of the media stream to further destination nodes located downstream to the destination node.

In certain embodiments, the input sources 208, 210, 212, and 214 of source nodes 218, 230, 224, and 236 respectively may represent input channels (e.g., a satellite-based pathway and a terrestrial pathway) that acquire signals representing a media stream from a media source. In some examples, an input source can also act as a source node within the virtual media router 116 for intermediary transmission of the media stream to one or more destination nodes. In certain embodiments, multiple input sources may be used by the source node for redundancy. For instance, the multiple input sources in a source node may provide identical source material (i.e., media content) from a media source. The source node may switch from one (e.g., primary) input source to another (e.g., secondary) input source upon detecting a failure of the primary input source. In certain embodiments, the input sources of a source node may differ in some capacity, e.g., by using two or more Internet service providers (ISPs) to send the media stream from the media source to the source node using parallel pathways.

In certain embodiments, the virtual media router 116 may implement operations to delete a particular source node. For instance, if one of the source nodes fails or is taken offline, then the virtual media router 116 may use the remaining source nodes to route any media streams that were previously routed by that source node. In some instances, a source node may not be needed when the destination nodes associated with the source node need to be removed from the media stream. For instance, a destination node may need to be removed from the media stream when the destination node fails, when the node is switched with another node, when the media stream is no longer transmitted through a particular virtual media router, or for any other suitable reason. In one embodiment, a source node may be deleted based on an explicit request received from a user (e.g., 102) via a client application (e.g., 106). In one embodiment, a request to delete a particular source node may be received by an API associated with the virtual media router that is handling the particular media stream. A request to delete a source node may include any suitable data or metadata, such as an identifier of the particular media stream and an individual address (e.g., IP address) or other identifier of the source node. In certain embodiments, a source node may be deleted based on an automatic determination by the virtual media router. For example, if packets or units of data are deemed to be undeliverable to an address associated with a particular destination node, then the virtual media router may automatically delete the source node.

In certain embodiments, the virtual media routers 116, 120 (e.g., as shown in FIG. 1) may be under the control of different customers of the provider network and include capabilities to transmit information to each another. For instance, the virtual media routers 116, 120 may implement an API by which they can transmit information (e.g., regarding their source node capabilities) to each other.

It is to be understood that the source nodes 218, 230, 224, and 236 depicted in FIG. 2 are only one representation of an implementation of a virtual media router 116 used to implement some embodiments, and various alternate formulations with more or fewer source nodes with more or fewer input sources and destination nodes in different orderings could alternatively be used and implemented by one of ordinary skill in the art in possession of this disclosure to implement the various embodiments described herein.

Figure 3:
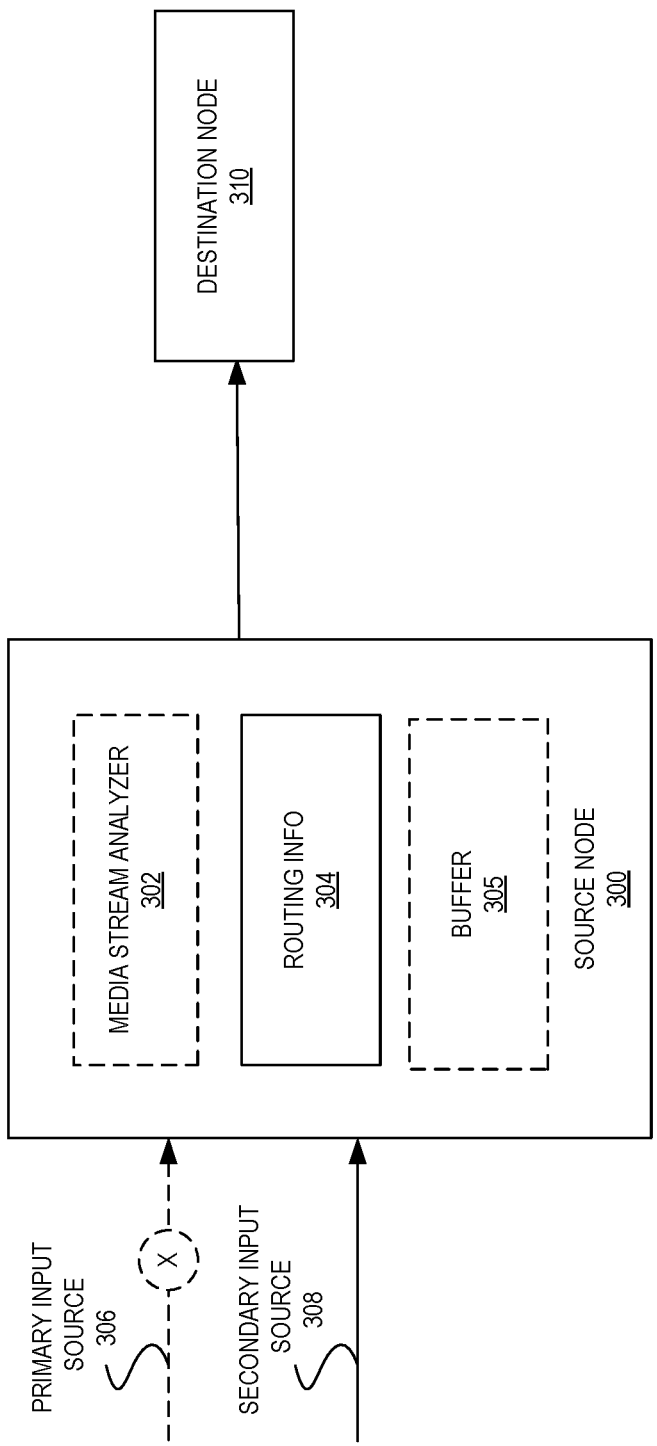
FIG. 3 is an illustration of one implementation of a source node in a virtual media router of the media routing service according to some embodiments.

FIG. 3 is an illustration of one implementation of a source node in a virtual media router of the media routing service according to some embodiments. As illustrated, in certain embodiments, a source node 300 may comprise a media stream analyzer 302 and routing information 304. The media stream analyzer 302 may process media streams received from a media sources 306 and 308 and optionally process information associated with the media streams such as the measured latency and bit rate of the media streams, various packet statistics (e.g., loss, out of order, late), processing modes, such as, forward error correction, demux, real time protocol (RTP) and the like.

In the illustrated example, the source node 300 comprises two input sources 306 and 308 that may transmit redundant instances of a particular media stream from a media source for redundancy. The redundant instances of the media stream may provide identical source material (i.e., media content) from the media source. In certain embodiments, upon detecting a failure or other quality issue in the primary input source 306, the source node 300 may switch from the primary input source 306 to another (e.g., secondary) input source 308. In certain embodiments, the input sources 306 and 308 may be different media streams and the source node 300 may be implemented as a 2×1 switch that can switch between these input sources. For example, the media streams may include media streams having different media stream characteristics, e.g., encoded, non-encoded, compressed, uncompressed streams, etc., and may arrive at a source node unaligned (e.g., corresponding elements of the media stream arrive at different points in time). In certain examples, the source node 300 may implement a buffer 305 that can store and re-align media streams arriving at different points in time before transmitting the media stream to different destination nodes. Although the illustration in FIG. 3 shows two input sources and one destination node, any suitable number and configuration of input sources and destination nodes may be used by a source node in other embodiments.

Figure 4:
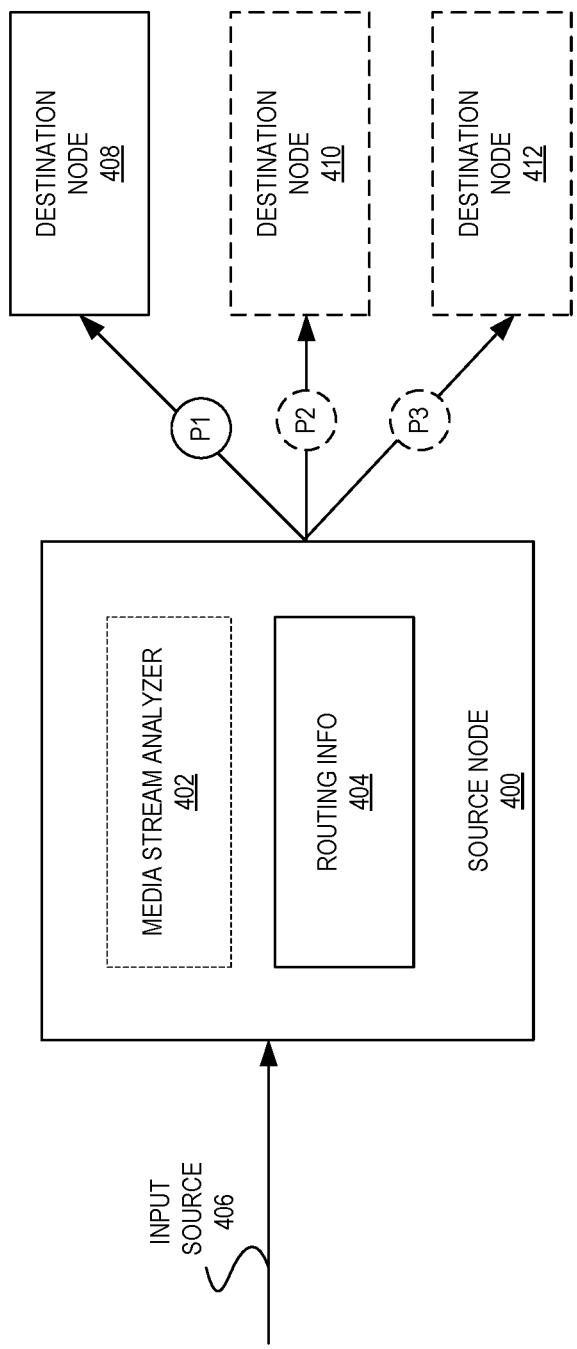
FIG. 4 is an illustration of another implementation of a source node in a virtual media router of the media routing service according to some embodiments.

FIG. 4 is an illustration of another implementation of a source node in a virtual media router of the media routing service according to some embodiments. As illustrated, in certain embodiments, a source node 400 may comprise a media stream analyzer 402 and routing information 404. In the illustrated example, the source node 400 may replicate elements of a media stream received from an input source 406 to multiple recipients or destination nodes 408, 410, and 412. As noted above, to perform replication of the media stream to multiple destination nodes, the source node may generate one or more packets or other units of data that include the element(s) of the media stream (potentially after being processed or transformed by the source node) in a form that is transmissible to the recipients. The source node may individually address the packet(s) to each of the recipients, e.g., such that each element of the media stream is not sent once to a group address but sent separately and in parallel to individual addresses of the recipients.

In certain embodiments, the source node 400 may assign ones or all of its output stream(s) (each associated with a destination node) with a different priority (e.g., P1, P2, P3) based on a variety of factors. These priorities may be defined and/or assigned by a user as part of routing commands (e.g., via a routing command API request 123) submitted to a virtual media router that implements the source node, where the priorities could be integer values (e.g., "1" for a highest priority output stream and some value "n" for a lowest priority output stream), classes (e.g., "low" or "medium" or "high"), or the like. These priorities assigned to the output streams may be used to indicate an order in which certain output media streams may be dropped by the source node if needed for performance-related reasons. For example, if a source node experiences performance-related issues, such as processing or transmission difficulties or limits (e.g., of the node or the network in which the node operates), the source node may identify and drop one or more existing low-priority streams (e.g., by halting transmitting the stream and/or processing the stream) in an attempt to eliminate the performance issues while ensuring the highest-possible quality for the more comparatively important streams as indicated by these priority values.

By way of example, a user may configure priorities for output streams based on a relative importance of each output stream in a particular context. For instance, a first output stream leading toward a first destination node 408 may be assigned a high priority P1 because it provides a primary media stream to a primary destination node that is driving a production workflow (and thus is of a highest relative importance), while a second output stream leading toward a second destination node 410 may be assigned a comparatively low priority P2 because it carries a testing or monitoring stream that is used for stream monitoring purposes (and thus, is of a comparatively lower relative importance from the user's perspective, as it may be more crucial to always provide an uninterrupted primary media stream than the testing or monitoring stream). Thus, upon experiencing performance degradation in some manner, the source node may first drop the second testing/monitoring stream while keeping the first primary media stream going. In some embodiments, the source node may optionally attempt to restart a dropped stream after some threshold amount of time, or after detecting that the performance-related issue(s) have dissipated. However, in some embodiments the virtual media router may cause the associated user to be notified of the dropped stream(s) and may re-enable these stream(s) upon a specific request issued on behalf of the user or according to a policy specified by the user.

Figure 5:
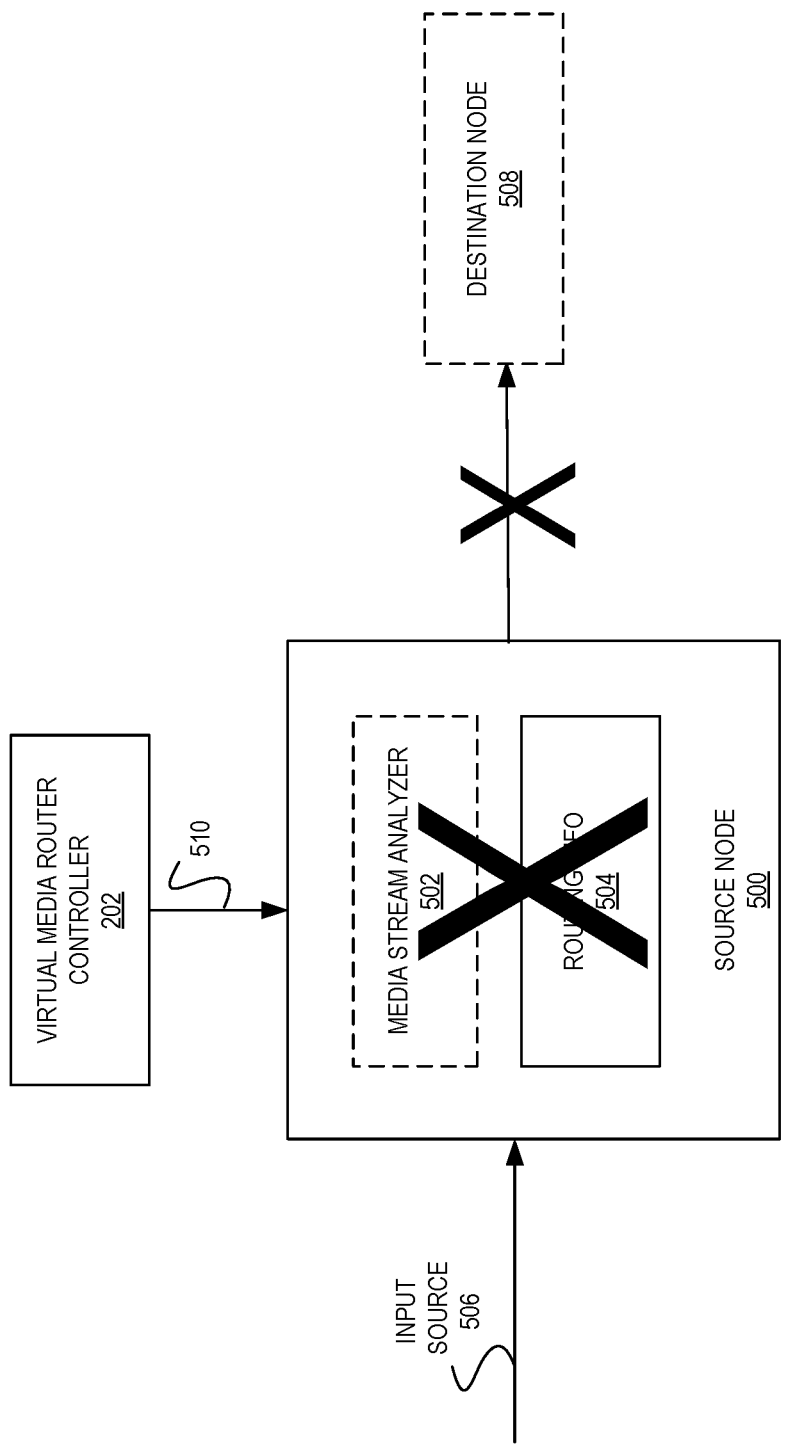
FIG. 5 is an illustration of another implementation of a source node in a virtual media router of the media routing service according to some embodiments.

FIG. 5 is an illustration of another implementation of a source node in a virtual media router of the media routing service according to some embodiments. In the illustrated example, a source node 500 (comprising a media stream analyzer 502 and routing information 504) has one input source 506 that transmits a particular media stream from a media source to a destination node 508. As noted above, in certain situations, a destination node associated with a source node may need to be removed from the media stream. For instance, a destination node may need to be removed when the destination node fails, when the destination node is switched with another destination node, when the media stream is no longer transmitted through a particular virtual media router, if packets or units of data are deemed to be undeliverable to an address associated with a particular destination node, or for any other suitable reason. In this case, the virtual media router controller 202 may determine that the source node does not need to route media streams to any destination and transmit a command 510 to the source node to stop the source node from forwarding the media stream or may transmit a command 510 to remove and/or delete the source node itself. In this manner, the disclosed media routing service may enable various computing resources within the provider network to be efficiently used for routing of media streams. Additionally, the media routing service can automatically provision (i.e., spin up) a new source node when a particular destination node becomes available or when the provider network begins to experience high volumes of traffic.

Figure 6:
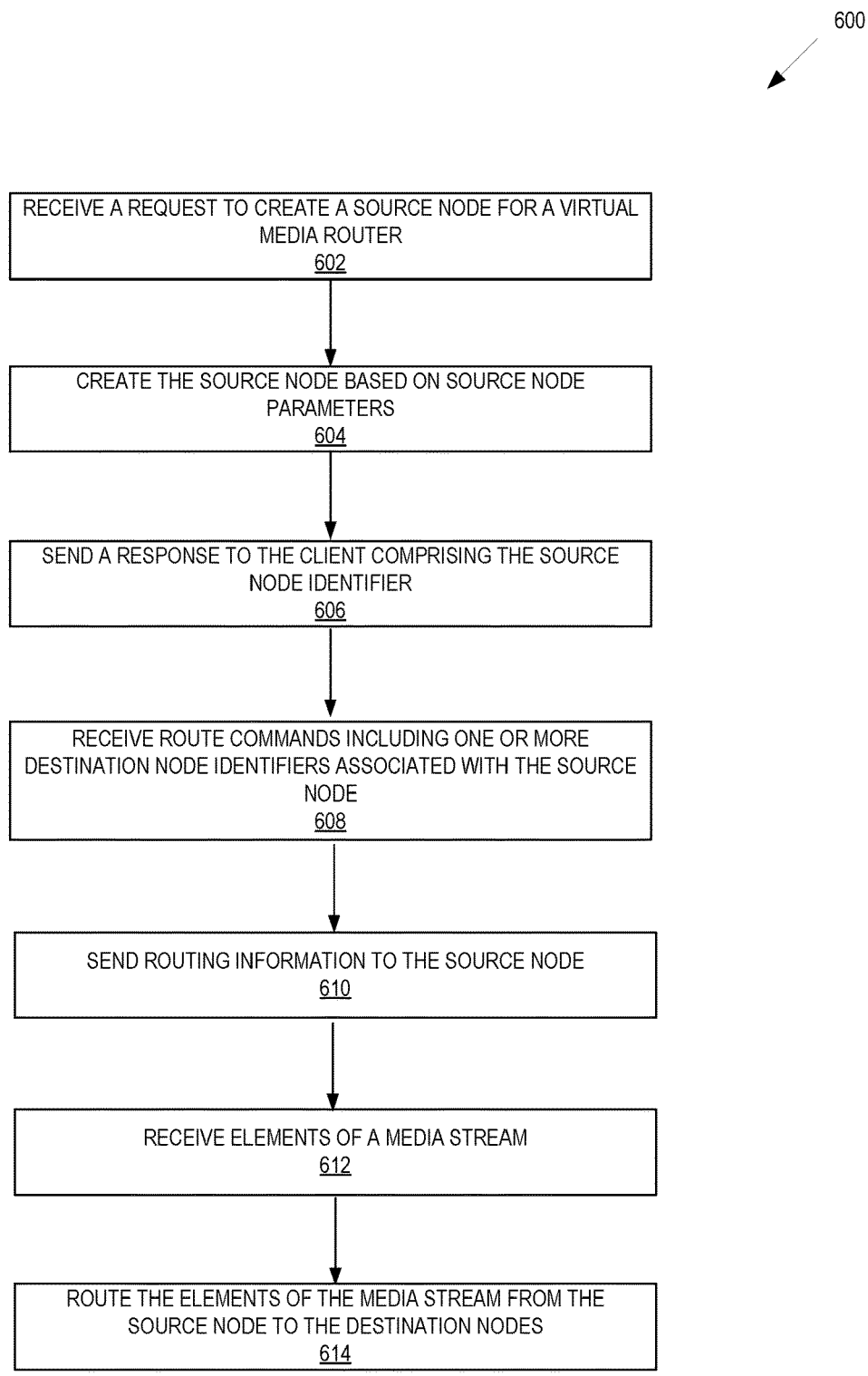
FIG. 6 is a flow diagram illustrating operations of a method for routing media streams in a provider network according to some embodiments.

FIG. 6 is a flow diagram illustrating operations 600 of a method for routing streams in a provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the media routing service (e.g., 114) and the virtual media router (e.g., 116) of the other figures.

The operations 600 include, at block 602, receiving a request to create a source node for a virtual media router within the provider network. As noted above, a "source node" may represent a virtual or a physical computing instance launched by a virtual media router for routing media steams from one or more media source(s) to one or more destination node(s). In certain embodiments, the source node may comprise one or more source node parameters. The source node parameters may include, for instance, an identifier of a particular media stream originating from a media source, an identifier of the virtual media router, or one or more characteristics associated with the media stream. The characteristics associated with the media stream may include, for instance, a size of the media stream, a type of the media stream, a resolution of the media stream, or a bit rate of the media stream. In some examples, the request may specify other information associated with the media stream such as whether replication of the media stream is required, the number of recipients (e.g., destination nodes) that the media stream has to be replicated and transmitted to, and so on.

In certain embodiments, the request to create a source node may be modeled as an Application Programming Interface (API) request and included in a HTTP request message by a user (e.g., 102) via a client application (e.g., 106) to the virtual video router. The API request may include header information specifying, for example, the identifier of a particular media stream, the endpoint of the virtual media router to which the request is being sent, and other characteristics associated with the media stream (as noted above).

The operations 600 further include, at block 604, creating the source node based on the source node parameters. In certain embodiments, creating a source node may involve determining, by the virtual media router, a configuration of one or more computing resources in the provider network to be provisioned to launch the source node and launching by the virtual media router, the source node based on the one or more computing resources. In certain examples, the operations at block 604 may involve, processing, by the virtual media router, the request, and transmitting a message (e.g., via an API call) to a virtualization service in the provider network to request allocation of one or more computing resources (e.g., CPU, memory, and possibly other hardware resources) to launch the source node.

The operations 600 further include, at block 606, sending a response comprising a source node identifier (e.g., an IP address) associated with the source node to the client.

The operations 600 further include, at block 608, receiving one or more route commands from the client. In certain examples, the route commands may include a source node identifier (e.g., IP address) associated with the source node and one or more identifiers (e.g., IP addresses) of the destination nodes. In certain examples, the user (e.g., 102) may utilize a web-based GUI, CLI, or any other type of interface in the client application (e.g., 106) to submit the routing commands.

The operations 600 further include, at block 610, sending routing information to the source node. In certain embodiments, the routing information may be stored by the virtual media router in a routing table. As noted above, the routing information may include source node identifiers associated with each source node, identifiers of media streams to be routed from each source node to one or more destination nodes, and destination node identifiers (e.g., IP addresses) of the final destinations of the media stream. In certain embodiments, the routing information may also include, next hop information (i.e., an IP address) of the next source node or destination node to which the packets of the media stream should be forwarded to, and other metrics such as the distance/cost assigned to each available route so that the most cost-effective path can be chosen. In certain embodiments, the operations at block 610 may further include sending the routing information via an API call to the source nodes. The source nodes may receive the routing information via the API call and populate and/or update their respective routing tables with the routing information.

In certain embodiments, the operations at block 612 may further include receiving elements of a media stream from a media source. As noted above, the media source may correspond to a source (origin) of the media streams, (e.g., media source(s) 124). In other examples, the media source may correspond to the streaming media service (e.g., 126) in the provider network that is capable of ingesting the media stream from the media source(s).

The operations 600 further include, at block 614, routing the elements of the media stream from the source node to the destination nodes. In certain embodiments, the operations at 614 may include, receiving by the source node, at one or more input sources associated with the source node, the media stream and securely routing the media stream to the destination nodes. As noted above, in some examples, the input sources of a source node may represent input channels (e.g., a satellite-based pathway and a terrestrial pathway) that acquire signals representing the media stream from the media source. In certain embodiments, multiple input sources may be used by the source node for redundancy and may provide identical source material (i.e., media content) from a media source.

Figure 7:
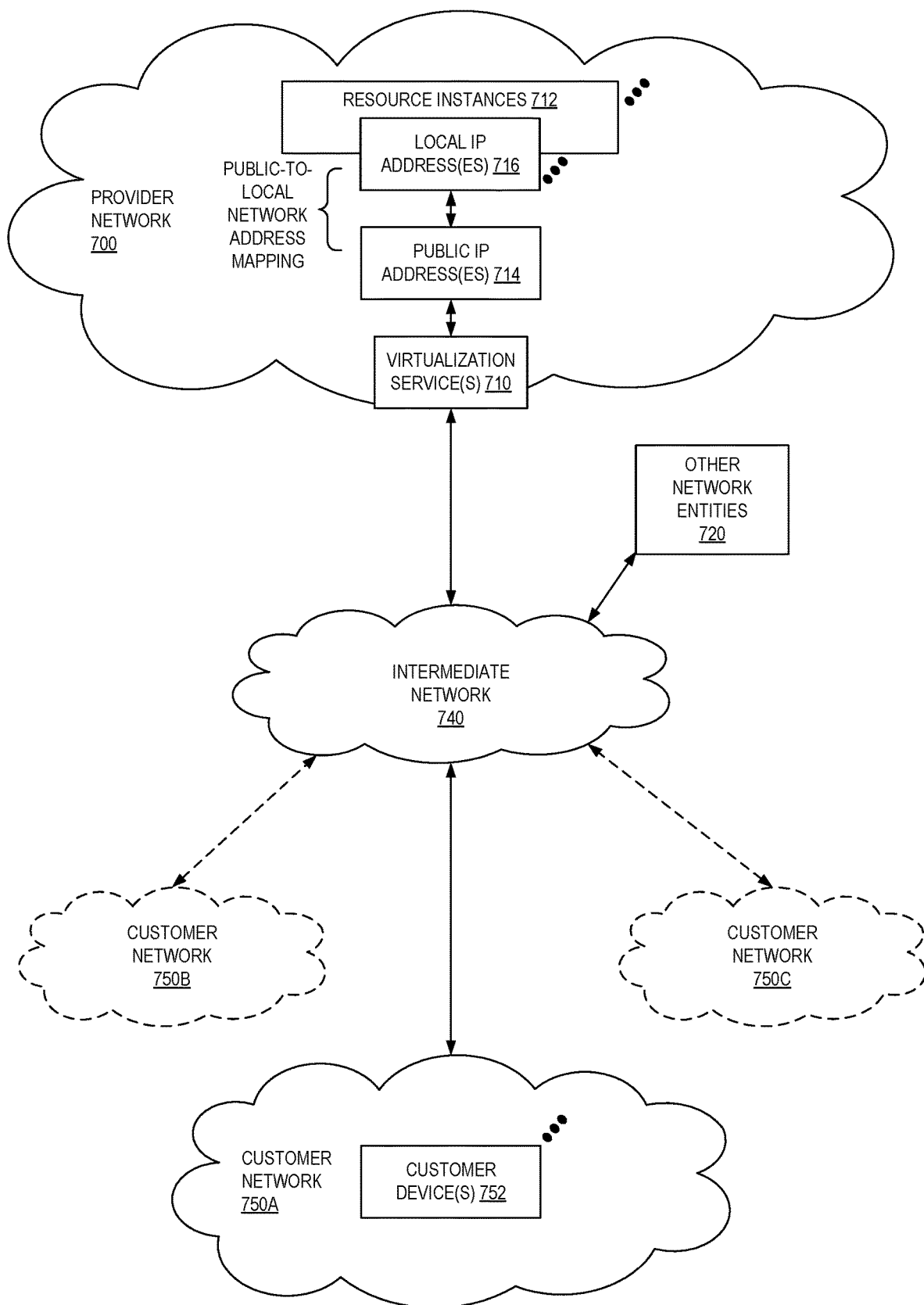
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
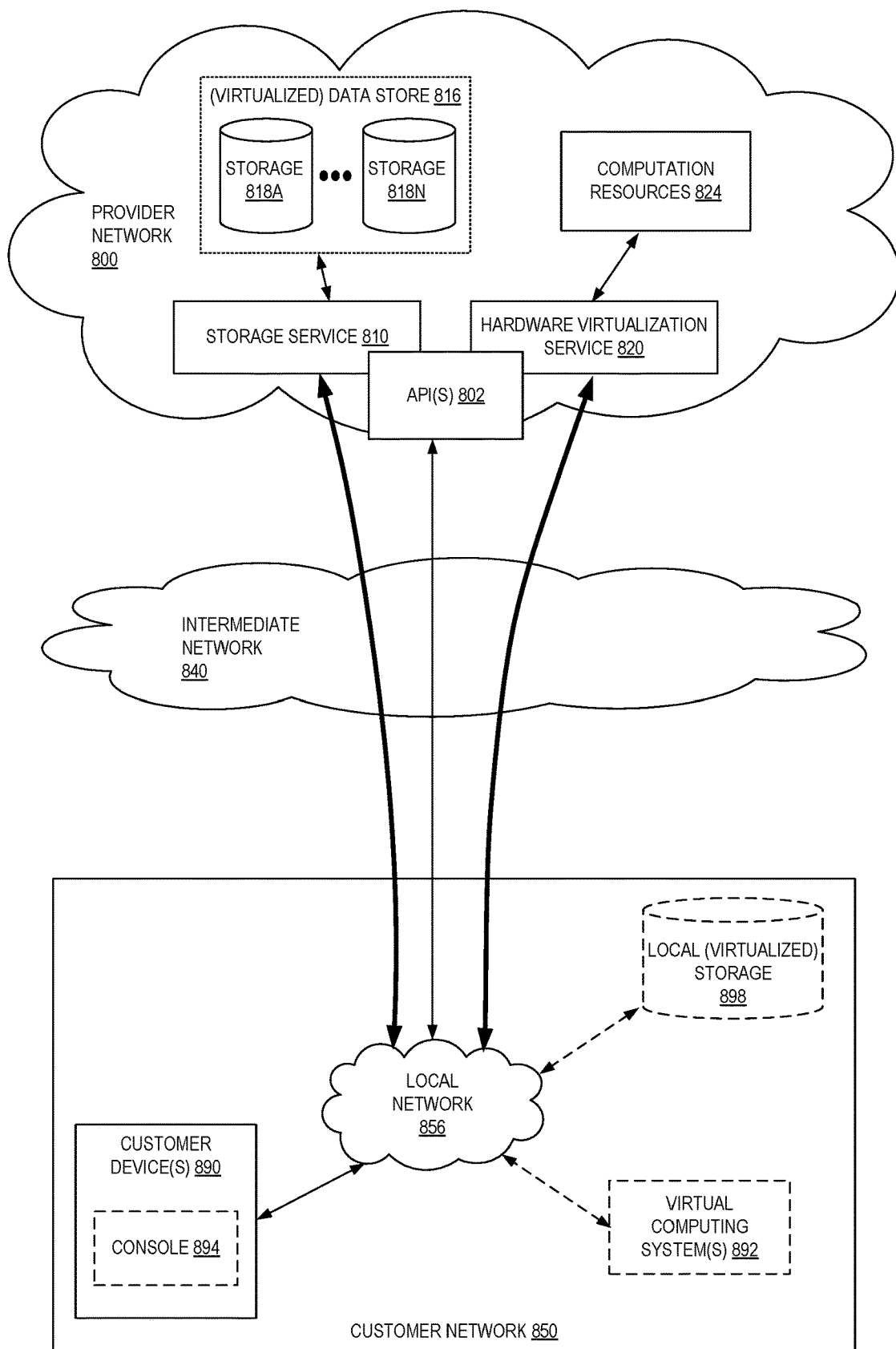
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
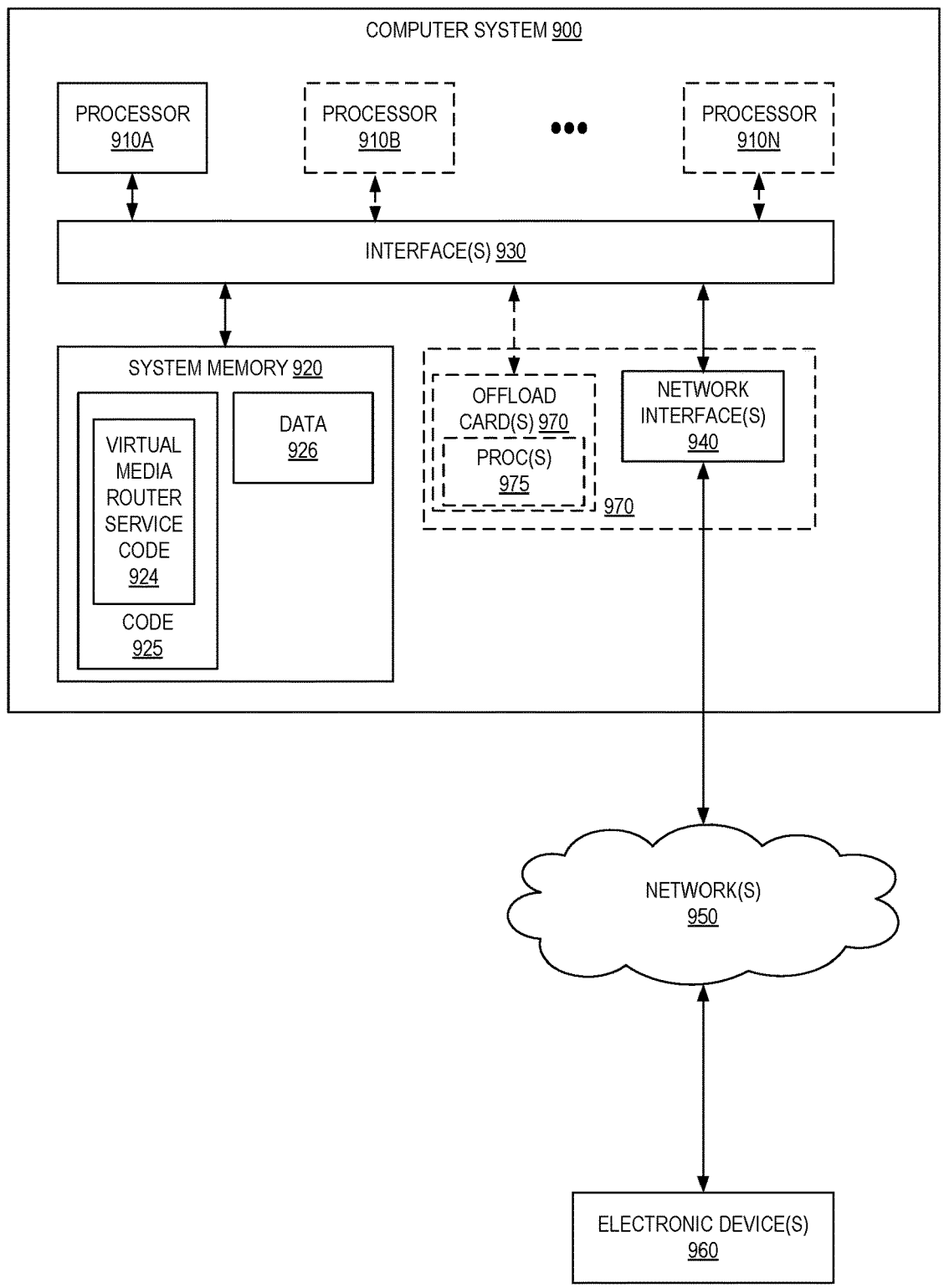
FIG. 9 is a block diagram illustrating an example computer system that may be used in some embodiments.

In some embodiments, a system that implements a portion or all of the techniques for routing media streams in a provider network as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926. In certain examples, the code 925 may comprise virtual media router service code 924 to perform the routing of media streams between various media sources and destinations.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a provider network, a request to create a source node for a virtual media router within the provider network, the request comprising one or more source node parameters, the source node parameters comprising at least one an identifier of the virtual media router or one or more characteristics associated with a video stream;
creating the source node based on the one or more source node parameters, the creating comprising determining a configuration of one or more computing resources in the provider network to launch the source node;
sending a response to a client, the response comprising a source node identifier associated with the source node;
receiving one or more routing commands from the client, the one or more routing commands comprising the source node identifier associated with the source node and one or more identifiers of one or more destination nodes;
sending routing information to the source node, the routing information including the one or more identifiers of the one or more destination nodes;
receiving, at one or more input sources associated with the source node, one or more elements of the video stream, the one or more input sources representing one or more input channels for acquiring the video stream from a video source; and
routing, based on the routing information, the one or more elements of the video stream from the source node to the one or more destination nodes.

2. The computer-implemented method of claim 1, wherein the one or more characteristics associated with the video stream comprise at least one of a size of the video stream, a type of the video stream, a resolution of the video stream, or a bit rate of the video stream.

3. The computer-implemented method of claim 1, further comprising:
responsive to the request, determining, by the virtual media router, that replication of the video stream to the one or more destination nodes is to be performed, and wherein the configuration of the one or more computing resources to be allocated to launch the source node is further based on the determining.

4. A computer-implemented method comprising:

receiving, at a provider network, a request to create a source node for a virtual media router within the provider network, the request comprising one or more source node parameters;

creating the source node based on the one or more source node parameters;

sending a response to a client, the response comprising a source node identifier associated with the source node;

receiving one or more routing commands from the client, the one or more routing commands including one or more destination node identifiers of one or more destination nodes to be associated with the source node;

sending routing information to the source node, the routing information including the one or more destination node identifiers;

receiving, at the source node, one or more elements of a media stream; and routing, based on the routing information, the one or more elements of the media stream from the source node to the one or more destination nodes.

5. The computer-implemented method of claim 4, wherein the one or more source node parameters comprise at least one of an identifier of the virtual media router or one or more characteristics associated with the media stream.

6. The computer-implemented method of claim 5, wherein the one or more characteristics associated with the media stream comprise at least one of a size of the media stream, a type of the media stream, a resolution of the media stream, or a bit rate of the media stream.

7. The computer-implemented method of claim 4, further comprising:

responsive to the request, determining, by the virtual media router, a configuration of one or more computing resources in the provider network to launch the source node; and launching, by the virtual media router, the source node based on the one or more computing resources.

8. The computer-implemented method of claim 7, further comprising:

responsive to the request, determining, by the virtual media router, that replication of the media stream to the one or more destination nodes is to be performed, and wherein the configuration of the one or more computing resources to be allocated to launch the source node is further based on the determining.

9. The computer-implemented method of claim 4, wherein the request to create the source node is submitted by a user at the client via use of an Application Programming Interface (API) call to the virtual media router.

10. The computer-implemented method of claim 4, wherein the one or more routing commands further comprise the source node identifier associated with the source node.

11. The computer-implemented method of claim 4, further comprising:

generating, by the virtual media router, the routing information associated with the source node based on the one or more routing commands; and sending the routing information to the source node.

12. The computer-implemented method of claim 4, further comprising:

receiving, at one or more input sources associated with the source node, the elements of the media stream, wherein the one or more input sources represent one or more input channels for acquiring the media stream from a media source.

13. The computer-implemented method of claim 4, further comprising:

detecting, by the source node, a failure of a primary input source associated with the source node; and in response to the detecting, switching, by the source node, the media stream to be routed to a secondary input source associated with the source node.

14. The computer-implemented method of claim 4, further comprising:

determining, by the virtual media router, that the one or more destination nodes associated with the source node need to be removed; and in response to the determining, removing, by the virtual media router, the source node.

15. A system comprising:

a first one or more electronic devices of a provider network to implement a streaming media service; and a second one or more electronic devices of the provider network to implement a media routing service, the media routing service comprising a virtual media router and including instructions that upon execution cause the media routing service to:

receive a request to create a source node for the virtual media router, the request comprising one or more source node parameters;

create the source node based on the one or more source node parameters;

send a response to a client, the response comprising a source node identifier associated with the source node;

receive one or more routing commands from the client, the one or more routing commands including one or more identifiers of one or more destination nodes to be associated with the source node;

send routing information to the source node, the routing information including the one or more identifiers of the one or more destination nodes;

receive, at the source node, one or more elements of a media stream generated by the streaming media service; and route, based on the routing information, the one or more elements of the media stream from the source node to the one or more destination nodes.

16. The system of claim 15, wherein the one or more source node parameters comprise at least one of an identifier of the virtual media router or one or more characteristics associated with the media stream.

17. The system of claim 15, wherein the instructions upon execution further cause the media routing service to:

determine a configuration of one or more computing resources in the provider network to be provisioned to launch the source node; and launch the source node based on the one or more computing resources.

18. The system of claim 15, wherein the request to create the source node is submitted by a user at the client via use of an Application Programming Interface (API) call to the media routing service.

19. The system of claim 15, wherein the one or more routing commands further comprise the source node identifier associated with the source node.

20. The system of claim 15, wherein the instructions upon execution further cause the media routing service to:

generate routing information associated with the source node based on the one or more routing commands; and transmit the routing information to the source node.

\* \* \* \* \*